United States Patent [19]

Schülein

[11] Patent Number: 5,799,369
[45] Date of Patent: Sep. 1, 1998

[54] UTENSIL HANDLE

[75] Inventor: Rolf Günter Schülein, Singhofen, Germany

[73] Assignee: Leifheit AG, Nassau, Germany

[21] Appl. No.: 628,056

[22] Filed: Apr. 5, 1996

[30] Foreign Application Priority Data

Apr. 7, 1995 [DE] Germany ............... 195 13 245.9

[51] Int. Cl.[6] .................... B25G 3/00; A47J 45/06
[52] U.S. Cl. ............ 16/110 R; 16/110 A; 16/DIG. 12; 16/DIG. 19; 30/296.1
[58] Field of Search .............. 16/111 R, DIG. 19, 16/DIG. 12, DIG. 18; 81/177.1, 489; 30/340, 342, 298, 296.1; D8/DIG. 4; D7/393, 667

[56] References Cited

U.S. PATENT DOCUMENTS

| D. 143,568 | 1/1946 | Wemyss | D8/DIG. 4 |
|---|---|---|---|
| D. 143,570 | 1/1946 | Wemyss | D8/DIG. 4 |
| 4,712,304 | 12/1987 | Sanelli | 16/DIG. 19 |
| 4,721,021 | 1/1988 | Kusznir | 81/489 |
| 4,739,536 | 4/1988 | Bandera et al. | 16/111 R |
| 4,974,286 | 12/1990 | Stowell et al. | 16/111 R |
| 5,145,082 | 9/1992 | Craft, Jr. et al. | 16/111 R |
| 5,390,572 | 2/1995 | Gakhar et al. | 16/111 R |
| 5,398,369 | 3/1995 | Heinzelman et al. | 16/111 R |
| 5,530,989 | 7/1996 | Remmert et al. | 16/DIG. 12 |
| 5,601,003 | 2/1997 | Amtenbrink et al. | 81/177.1 |

FOREIGN PATENT DOCUMENTS

| 0 176 486 | 5/1989 | European Pat. Off. | |
| 2600574 | 12/1987 | France | |
| 2635998 | 3/1990 | France | 81/489 |
| 2274615 | 8/1994 | United Kingdom | 81/489 |
| WO-093016846 | 9/1993 | WIPO | |

*Primary Examiner*—Chuck Mah
*Assistant Examiner*—Donald M. Gurley
*Attorney, Agent, or Firm*—Frishauf, Holtz, Goodman, Langer & Chick

[57] ABSTRACT

A tool handle (3) in which a handle part (5) is made from a material with a Shore hardness of at least 70 and a thumb and/or finger rests (6, 8) which is integral with the handle part (5) is made from a material having a Shore hardness of no more than 60. The thumb and/or finger rests (6, 8) are molecularly bonded, or integrated into the handle part (5) by a two-component molding process.

5 Claims, 2 Drawing Sheets

5,799,369

1

UTENSIL HANDLE

FIELD OF THE INVENTION

The present invention is directed to a utensil or tool handle and more particularly to a handle for a kitchen utensil which permits safe, accident-free operation.

DESCRIPTION OF THE RELATED ART

Today, utensil and tool handles, and especially for higher quality products, are designed primarily based on ergonomically considerations. This is especially important for utensils and tools that are in constant use. Today, the design of handles for butcher's knives, screwdrivers, pliers and the like is purely based on ergonomic considerations. Naturally, ergonomically designed handles could also be used in connection with common kitchen items similar to the aforementioned utensils and tools. Unfortunately, ergonomics alone do not satisfy a user's requirements for spoons, can openers, jar openers, meat forks, kitchen knives and other kitchen utensils.

European Patent Publication EP-B-0 176 486 discloses a handle for a kitchen knife whose plastic core is covered with an elastomeric layer. In order to securely attach the elastomeric layer to the plastic core, the elastomeric layer is pierced at several locations by the plastic core. Experience and testing have shown that an elastomerically-covered handle can at least partially compensate for deficiencies in ergonomics by providing better gripping of the tool, and therefore increased safety from accidents. However, an elastomerically-covered handle lacks visual appeal and user comfort. The elastomer may provide an unpleasant feeling to a user, and the user can not comfortably utilize the tool having the elastomerically-covered handle.

French Patent Publication FR 2,600,574 discloses a knife handle having a grip indentation. The grip indentation is provided to facilitate manipulation of the knife and to permit the user to transmit greater force to the cutting blade. Since the incorporation of a grip indentation is an additional add-on component on the knife handle, the handle is not aesthetically appealing and the manufacturing cost increases. Moreover, an added grip cover is extremely inconvenient to clean and can provide a breeding ground for bacteria.

THE INVENTION

It is an object of the present invention to provide an aesthetically appealing utensil or tool handle, especially a kitchen tool, that is largely free of ergonomic constraints, and permits safe, accident-free use, with a comfortable feel to the skin of the user, while being resistant to bacterial contamination.

Briefly, in accordance with the present invention, a tool handle is formed onto a shank of a tool which extends from a functional head of the tool. The tool handle includes a core region which is operatively joined with the shank. The core region extends in an axial direction from one end of the shank opposite the joinder of the shank and the functional head. The tool handle also includes a handle part which is preferably coupled to both the shank and the core region, and at least one gripping section integral with the handle part. The gripping part includes a thumb rest on a top portion of the handle part and finger rests on the back side of the handle part. The finger rests extend along at least a portion of a lateral side of the handle part. The thumb rest and finger rests are positioned and contoured to accommodate a user's hand. The handle part is manufactured from a material having a Shore hardness of at least 70, e.g. a thermosetting plastic, and the finger rests are manufactured from an elastomer material, e.g. silicone having a Shore hardness of no more than 60 in a two-component molding process, so that there will be a molecular bond between the plastic of the handle and of the finger rests.

A preferred form of the handle for a kitchen tool or utensil, a s well as other embodiments, objects, features and advantages of this invention, will be apparent from the following detailed description of illustrative embodiments thereof, which is to be read in connection with the accompanying drawings.

BRIEF DESCRIPTION OF THE PREFERRED EMBODIMENTS

DETAILED DESCRIPTION OF THE PREFERRED EMBODIMENTS

Figure 1:
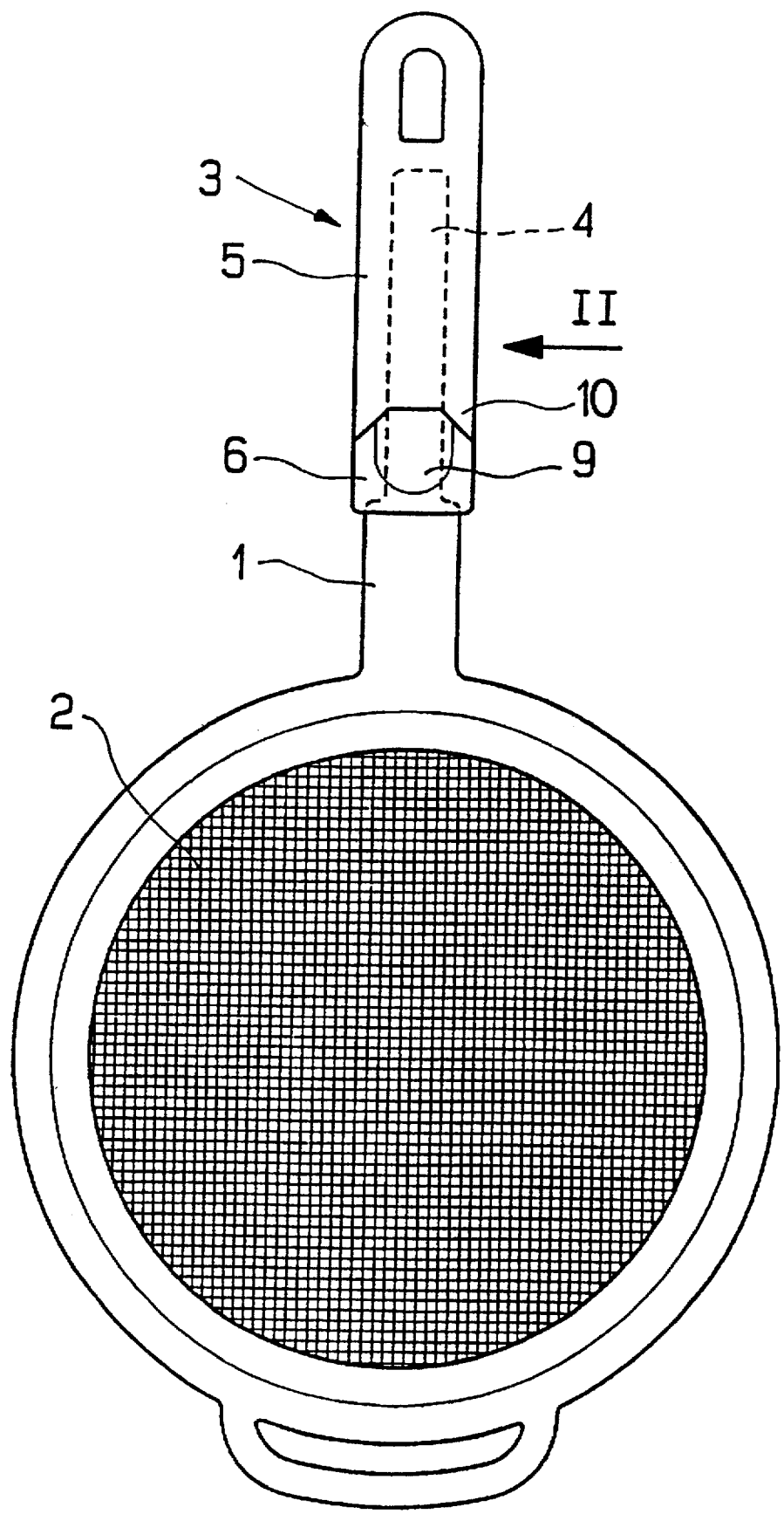
FIG. 1 is a top plan view of a kitchen sieve with a handle constructed in accordance with the present invention.

Referring now to FIG. 1, handle 3 is formed onto shank 1 of functional head 2 (i.e., kitchen sieve). While the present invention is shown in FIG. 1 coupled to a sieve, it is understood that the present invention can be utilized in connection with a plurality of different tool heads and need not be limited to sieves. The shank 1 is preferably integrally formed with the functional head 2. The shank 1 can be made of plastic, metal or another suitable material. The shank 1 has a core region 4 operatively joined thereto. The core region 4 preferably extends in an axial direction from an end of the shank opposite the joinder of the shank and the functional head 2. As will be described in more detail below, core region 4 is operatively joined to a handle part 5.

When the shank 1 is made of plastic, the core region 4 and handle part 5 are preferably made of substantially the same plastic material. Materials suitable for this purpose, depending on the intended use, are polypropylene (PP), acrylonitrile-butadiene-styrene copolymer (ABS), or, for use at and for exposure to substantially elevated temperatures (i.e., such as a spatula for cooking hamburgers, pancakes and the like on a heated surface), melamine.

Figure 3:
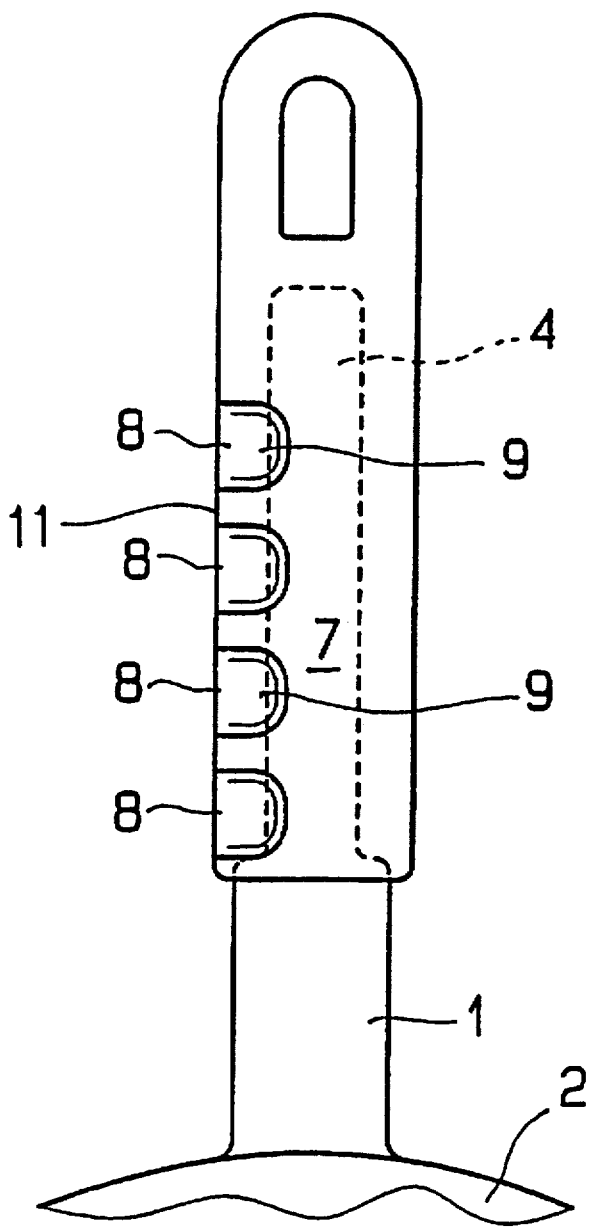
FIG. 3 is a partial bottom view of FIG. 2 in the direction of arrow III.
Figure 2:
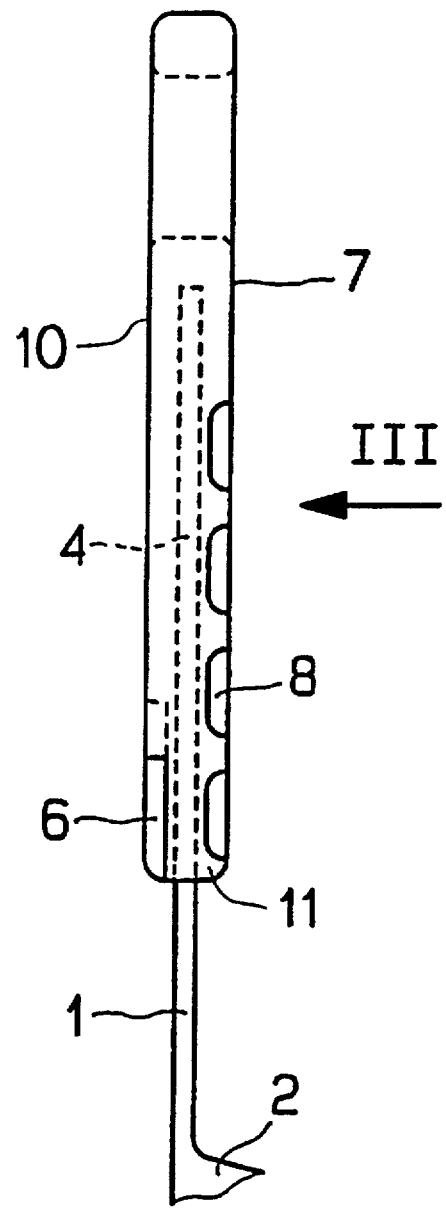
FIG. 2 is a partial side view of FIG. 1 in the direction of arrow II.

Referring now to FIGS. 2 and 3, handle part 5 includes finger rests 6, 8 which are formed in the handle part 5. In order to form a seamless transition so that there are no interstices where food can collect and bacteria can breed, the finger rests are made integrally with the handle part by a two-component molding process as is well known in the art. A two-component molding process is described in Section 3.2.2.7 entitled "Mehrfarben-Spritzguβ", Section 3.2.2.8 entitled "Mehrkomponenten-Spritzguβ", and Section 3.2.2.9 entitled "Sequenzverfahren" on pages 215–216, of Kunststoff Lexikon published by Carl Hanse Verlag of Munchen (Munich), Germany. Any two-component molding method which provides a substantially seamless transition between components formed with separate materials may be employed.

Instead of using the two-component molding process, it is also foreseen to separately machine the gripping parts 6,8 and to attach the gripping parts 6,8 to the handle part 5. If this process is used, however, there is a substantial risk that the bond which secures the gripping parts to the handle part may break, thus dislodging the gripping parts from the handle part. The bond which secures the gripping parts to the handle part is particularly susceptible to separating of breakage when the utensil is to be cleaned in a dishwasher. Any cracks can be a site for bacterial contamination.

The finger rests preferably include a thumb rest 6 and finger rests 8. The thumb rest 6 is preferably positioned on a top side portion 10 of the handle part 5 and the finger rests 8 on a bottom side portion 7 thereof. The thumb rest 6 and the finger rests 8 are each formed with a recessed portion or concave depression 9 for placement of a user's thumb and fingers respectively. As shown in FIG. 3, the finger rests 8 transversely preferably extend across only a portion of the bottom of the handle part 5. The finger rests 8 also extend along a portion of a side portion 11 of the handle part as shown in FIG. 2. This arrangement ensures a secure grip of the handle by the user.

As previously noted, the handle part 5 is made of a plastic that is comfortable to the skin, such as polypropylene (PP), acrylonitrile-butadiene-styrene copolymer (ABS), and the like. For use at elevated temperatures, the handle part 5 may be made of a temperature-resistant thermosetting plastic or duroplastic, such as melamine and the like. Whichever material is selected for the handle part 5, the material preferably has a Shore hardness of at least 70. The gripping parts i.e., thumb rest 6 and finger rests 8, however, are preferably made of an elastomer having a Shore hardness of no more than 50. The choice of materials may vary depending on the utensil's intended use. If a duroplastic is used to form the handle part 5, an elastomer that is also temperature-resistant, such as silicone, may be used to form the thumb rest 6 and finger rests 8.

Surprisingly, it has been found that it is sufficient to use non-slip material in a limited region of the handle part 5 i.e., the thumb and finger rests 6, 8, while the remainder of the handle part is made of plastic that is comfortable to the touch such that the handle is not primarily ergonomically designed. Even though the handle has excellent manipulability, the handle is also aesthetically pleasing and therefore, the utensil to which the handle is coupled may also be decoratively exhibited in a kitchen.

It has been found to be especially advantageous to make the handle part from plastic by the aforementioned two-component molding process. As a result, a substantially strong molecular bond between the plastics used for the handle and the gripping parts is obtained, making the utensil substantially dishwasher-proof. In contrast to a traditional adhesive bond, by utilizing the molecular bond which results from a two-component molding process, any gaps between the handle part and the gripping parts that could become soiled and vulnerable to retaining bacteria are effectively prevented. The contoured recesses on the gripping parts for placement of a user's fingers not only provides practical utility but also improves the aesthetic appearance of the handle, while only slightly increasing the manufacturing costs. A variety of combinations of materials can be chosen for the present invention. For instance, a high-gloss (ABS) as the basic material, combined with an elastomer for use as the gripping parts, proves to be extremely suitable. For the gripping part portion of the handle where the thumb and fingers rest, silicone and soft plastics are also appealing if used with a different base material for the main part of handle 5.

While a kitchen sieve has been discussed above and shown in the drawings as the functional head of the kitchen utensil, the handle of the present invention can also be used for whisks, ladles, pancake turners, knives, forks, potato mashers, pots, pans, can openers and other kitchen utensils, that is, utensils which handle, or come in contact with, foods.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A bacterial contamination resistant kitchen tool handle adapted to be in contact with food substances, comprising
   a core region (4), which is operatively coupled to a functional part (2);
   a handle part (5) defining two opposed longitudinal sides coupled to the core region (4); and
   finger rests (6, 8) on the handle part,
   wherein
      the handle part (5) has a Shore hardness of at least 70;
      the finger rests (6, 8) have a Shore hardness of no more than 60,
      said finger rests are formed as concave depressions which include a thumb rest (6) formed on one side of the handle and a plurality of opposed finger rests (8) formed on the opposite side of the handle; and
      wherein the handle part (5) and the finger rests (6, 8) comprise plastic materials which are molecularly bonded in a two-component molding process.

2. The kitchen tool handle of claim 1, wherein the thumb rest (6) is substantially the size of a user's thumb tip.

3. The kitchen tool handle of claim 1, wherein the opposed finger rests (8) are substantially the size of a user's finger tips.

4. The kitchen tool handle of claim 1, wherein the opposed finger rests (8) are disposed along a bottom side portion (7) of the tool handle (5) in accordance with a grip of a user's hand about the tool handle, and spaced along a length direction of the tool handle (3) in accordance with a spacing of the user's finger tips.

5. The kitchen tool handle of claim 4, wherein said thumb rest (6) is disposed along a top side surface (10) of the tool handle (3) for receiving a thumb portion of the user's hand.

* * * * *